//patents

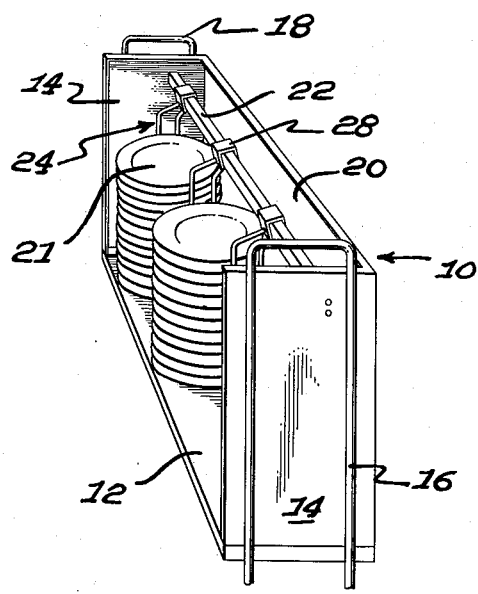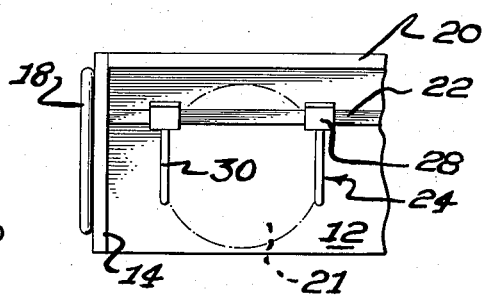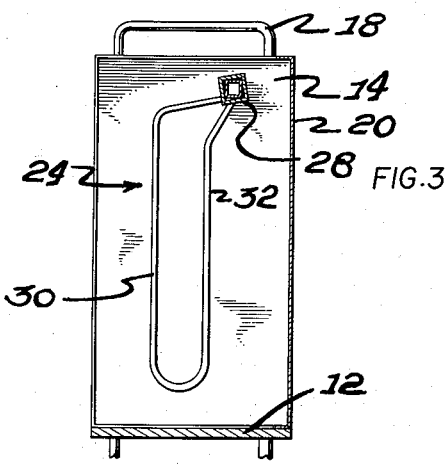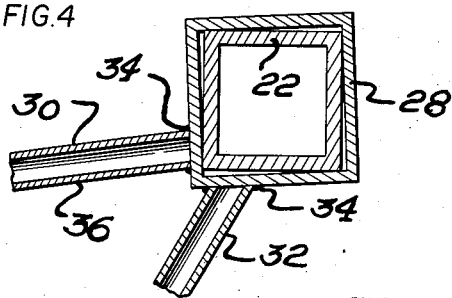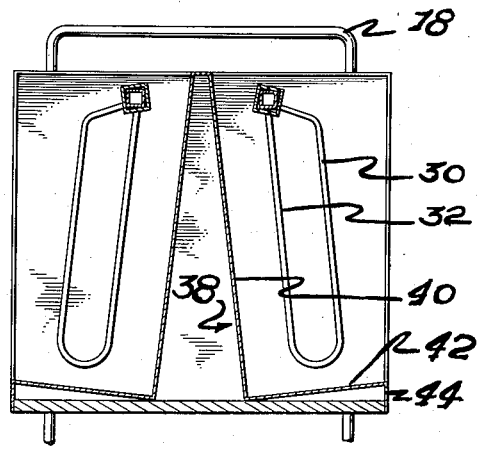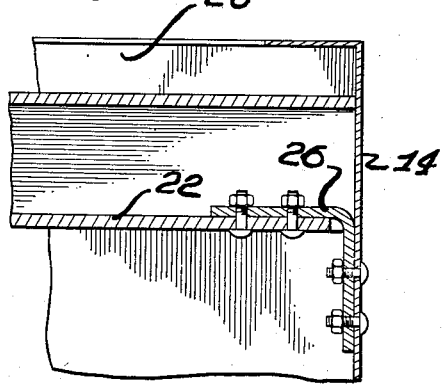

United States Patent Office 2,972,421
Patented Feb. 21, 1961

2,972,421

DISH STACK DIVIDER

William H. Frick, 19430 Seminole Drive,
Cleveland 17, Ohio

Filed Nov. 13, 1959, Ser. No. 852,683

9 Claims. (Cl. 211—184)

This invention relates to food service equipment and more particularly and specifically to novel and improved apparatus for storing, transporting and dispensing plates and dishes.

In the art of food service equipment it has long been a practice to use mobile carriers for plates, dishes and other culinary utensils. In plate and dish carriers it has sometimes been taught or suggested that dish separators or dividers be utilized to arrange and maintain dishes in stacked condition on or in such a carrier.

It has been experienced in the food service art that carriers providing for stacked dishes and plates usually include separators or stack division members secured to project from the dish supporting platform of the carrier in fixed relationship one to the other to provide bins or receptacles for stacked dishes. These prior carriers have been difficult to clean because of the rigid obstructions offered by the stack dividers and they have not been particularly versatile or adaptable to varying sizes in dishes, plates, saucers and other tableware.

It is a general object of this invention to provide novel and improved structure for separating and maintaining dishes and plates in stacked condition within a mobile service carrier.

A principal object of this invention lies in the provision of a unique and useful structure in combination with a mobile service carrier for maintaining dishes and plates in separated stacks within the carrier where they are readily convenient for removal and use.

Another object of this invention resides in the provision of dish stacking structure for a food service carrier or cart which enables the quick and easy adjustment of stack dividers and retaining components for accommodation and separation of plates and dishes of varying diameters and sizes.

Still another object of the instant invention lies in the provision of new and improved plate stack division and retaining structure for mobile food service carriers wherein tubular elements forming the stack division and retaining components are adjustably suspended from an overhead bar or rail thereby eliminating divider contact with the base platform and thus facilitating cleaning and maintenance of the mobile carrier.

A still further object of the present invention is the provision of a plural bar or post stack divider and retainer element which enables the effective and efficient retention of dishes of varied diameters with only adjustment of relative spacing of adjacent components within the carrier being required.

Another and further object of this invention resides in the provision of a structure for maintaining dishes and plates in stacked condition within a moblie food carrier which is of extremely simple and inexpensive design and manufacture and which is economically installed and utilized to obtain the maximum of efficiency and effectiveness in use.

Still further objects and advantages of this invention will become immediately apparent to one skilled in the art when the following description is read in the light of the attached drawings.

The nature of the present invention may be described in general terms as comprising dish stack dividers and retainers for mobile service carrier including an elongated header or rail, a plurality of collar elements slideably mounted on said headbar, and bar or post elements depending in spaced relationship from each of said collar elements toward the base platform upon which dishes are stacked.

Referring now to the accompanying drawings in which like numerals designate similar parts throughout the several views:

Fig. 1 is a pictorial view of a food service carrier incorporating dish stack dividers constituting the present invention.

Fig. 2 is a fragmentary plan view of the service carrier and dividers of Fig. 1.

Fig. 3 is a vertical section transversely of the carrier of Fig. 1 looking toward one end thereof.

Fig. 4 is an enlarged fragmentary vertical section through a divider element and its supporting headbar.

Fig. 5 is a fragmentary vertical section through a divider headbar and one end wall of the carrier.

Fig. 6 is a view similar to Fig. 3 of a modified form of the carrier and stack divider combination.

There is illustrated in the accompanying drawings embodiments of this invention which are intended as disclosures of the invention by way of example and not as a limitation on variations and modifications which fall within the scope and spirit of the broad concepts herein expressed. In these drawings there is shown a food service cart, generally designated at 10, which is of the same general type disclosed and claimed in United States Design Patent No. 176,511, and which includes a base platform 12, upstanding end walls 14, a wheel carriage or base (not shown) supporting the platform and end walls, in the present instance, by a tubular frame 16 components of which form handles 18 at each end of the carrier. The side of the carrier may be open or openable through the full height thereof above the platform 12. Side panels, such as shown at 20, may be fixed, removable or hinged relative to the carrier to close or provide access to the interior of the carrier from the sides thereof.

In the embodiment of the dish or plate divider assembly of Figs. 1–3, a single headbar and dish row are shown in the carrier to permit stacking and dispensing of dishes 21 through one side of the cart from a single row of dish stacks. The divider assemblies may also be arranged to permit stacking and dispensing from both sides of a carrier. Each assembly consists of a headbar or rail 22 and a plurality of stack divider components generally designated 24 arranged longitudinally of the headbar.

Specifically, the headbar 22 consists of a tubular member of rectangular, or, preferably, square cross-sectional configuration, Figs. 3 and 4, which extends longitudinally of the carrier between the end walls 14. The headbar is located adjacent the top edges of the spaced end walls and is spaced inwardly from the open side of the carrier. L-shaped brackets 26, or the like, interconnect and secure each end of the headbar to the adjacent end wall 14 of the carrier, as is best seen in Fig. 5.

Each stack divider component consists of a tubular collar 28 and, in the present illustrative embodiment, two tubular rods or posts 30 and 32 generally depending from the collar in spaced apart relationship. As can best be seen in Fig. 4, the tubular collar 28 is of complementary configuration to the headbar on which it is slidably telescoped. However, the inside dimensions of the collar 28 are sufficiently greater than the outside dimensions of the headbar 22 to permit the collar to rotate slightly on the bar to bring the walls of the collar into frictional, binding engagement on the external corner edges of the headbar, as demonstrated in Fig. 4.

The tubular bars or posts 30 and 32 are formed as legs of an elongated U-shaped unit with the free ends of the legs being welded, or the like, as at 34, to the collar 28. In the instant embodiment, the leg post 32 of the composite U divider assembly depends at slight angularity from the underside of the collar adjacent one edge thereof while the upper end of the other leg post 30 is turned at an angle, as at 36, to be secured into a vertical wall of the collar adjacent the same edge. The U portion joining the bar legs or posts 30 and 32 at their lower extremities is spaced above the platform 12 of the carrier, whereby the collar and divider components are freely suspended from and movable longitudinally of the headbar.

The offset attachment of the divider post elements to the collar distributes the weight of the leg elements outwardly from one side edge of the collar thereby normally tilting the collar rotatably on the headbar to frictionally bind the two together. Slight rotation opposite the gravitational tilt of the collar will free it from binding engagement with the headbar to permit free sliding adjustment of the longitudinal positioning of the collar on the bar. Thus, adjacent divider elements may be adjusted relative to one another longitudinally of the bar to provide for accommodation between them of dish stacks of any given diameter. At the same time, once released after longitudinal movement, the divider components will automatically bind on the headbar to give substantially rigid and lateral support and retention to a stack of dishes engaged thereagainst.

Further, the relative spacing of the two leg members of each divider component is such that the elements may be used to retain stacks of dishes from as little as 4½ inches in diameter up to 12 inches in diameter, all of which sizes will be rigidly and securely retained against displacement and readily removable in full stacks or dish by dish.

The embodiment above described, and shown in Figs. 1–3, contemplates a wheeled carrier having a horizontal bottom platform on which the dish stacks are supported. As a consequence, the stack dividers are shown with the leg portions 30 and 32 in substantially true vertical position when locked on the headbar. This secures the stack dividing legs perpendicular to the dish supporting surface.

In Fig. 6 there is shown a modified carrier wherein two open side panels provide opposed access to the interior. Further, the carrier is provided with a partitioning unit 38 which consists of a pair of downwardly diverging divider walls 40 each of which has a perpendicularly formed extension 42 bounded by a perpendicularly formed finishing flange 44.

The partitioning unit 38 is fixed within the carrier on the longitudinal centerline so as to locate the extension portions 42 in outwardly and upwardly inclined platform positions relative to the bottom wall of the carrier and to position the finishing flanges 44 as vertical edge facing longitudinally of both sides of the carrier.

A dish stack divider assembly is utilized with each compartment or bin provided within the carrier and defined by the partitioning unit. The angularity of the divider leg connections to the collars 28 of each divider unit are such that the legs 30 and 32 will be disposed perpendicularly to the inclined bin bottom 42 when the stack divider is rotated to a locked position on its supporting headbar 22. Thus, a dish stack seated on the inclined bottom 42, lying rearwardly against the inclined partition wall, is engaged longitudinally by the stack dividers.

It is, of course, fully contemplated that dish stack dividers of the construction and character as hereinbefore described may be used in single or plural arrangements within flat or inclined bottom carriers having one or more access openings on one or more sides without departing from the spirit and scope of this invention.

Thus, it may be seen that novel and improved dish stack dividing means have been provided in combination with a mobile food service carrier which function to attain all of the objects and advantages hereinbefore recited.

Having thus described and explained the inventive concepts embodied in the novel and improved structure constituting the present invention, what is desired to be claimed is:

1. In combination with a dish supporting platform, dish stack division means including a horizontal bar suspended above said platform, said bar being of rectangular cross-sectional configuration, a plurality of rectangular collars telescopically mounted on said bar, said collars being partially rotatable relative to said bar, a pair of stack divider posts depending from each collar in off-center relationship thereto, whereby the weight of said dividers causes partial rotation of said collars on said bar locking the same frictionally against longitudinal movement relative thereto.

2. In combination with a stack of dishes, a stack division and retaining means including, a horizontal headbar, a collar locked on said headbar, and spaced parallel posts projecting from said collar.

3. In combination with a stack of dishes supported on a platform, a stack division and retaining structure comprising, a headbar supported horizontally above the platform, a collar mounted on said headbar, and stack engaging means projecting from said collar toward and substantially perpendicularly to said platform.

4. In combination, an elongated shelf: an elongated bar of non-circular cross-sectional configuration supported in spaced parallel relationship above said shelf; a tubular collar of identical cross-sectional configuration to said bar and of slightly greater cross-sectional dimension, said collar being telescopically positioned on said bar, and an elongated shelf divider arm secured to one side of said collar to depend therefrom toward said shelf; whereby the offcenter weight of said arm will partially rotate said collar on said bar to bind the irregular surfaces thereof.

5. A combination as defined in claim 4 wherein said bar and collar are of complementary rectangular cross-sectional configuration.

6. A combination as defined in claim 4 wherein said divider arm consists of parallel spaced leg elements having adjacent ends secured to one side of the vertical centerline of said collar.

7. In combination with a transversely inclined elongated horizontal shelf, a longitudinally adjustable shelf divider comprising, an elongated bar of non-circular cross-sectional configuration supported in spaced parallel relationship above said shelf, a tubular collar of complementary cross-sectional configuration to said bar and telescopically freely slidable thereon, and an elongated shelf dividing arm secured to said collar at a point offset from the vertical centerline thereof and depending toward said shelf.

8. A structure as defined in claim 7 wherein said bar and tubular collar are of complementary rectangular cross-sectional configuration.

9. A structure as defined in claim 8 wherein said shelf dividing arm consists of parallel spaced leg elements having adjacent ends secured to said collar at points thereon off-set to the same side of the vertical centerline thereof.

References Cited in the file of this patent

UNITED STATES PATENTS

| | | |
|---|---|---|
| 592,250 | Kuenzle | Oct. 26, 1897 |
| 598,365 | Derby | Feb. 1, 1898 |
| 1,060,020 | Penneville | Apr. 29, 1913 |
| 2,346,150 | Brown | Apr. 11, 1944 |
| 2,665,869 | Samuels | Jan. 12, 1954 |